US010708276B2

(12) United States Patent
Doctor et al.

(10) Patent No.: US 10,708,276 B2
(45) Date of Patent: Jul. 7, 2020

(54) AUTHENTICATION SYSTEM AND METHOD

(71) Applicant: LEVEL 3 COMMUNICATIONS, LLC, Broomfield, CO (US)

(72) Inventors: Brad Bernay Doctor, Golden, CO (US); Nathaniel David Jamiel, Lafayette, CO (US); Taylor David Fraley, Erie, CO (US); John Grayson Fable, Longmont, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 653 days.

(21) Appl. No.: 14/948,268

(22) Filed: Nov. 21, 2015

(65) Prior Publication Data
US 2017/0012992 A1    Jan. 12, 2017

Related U.S. Application Data

(63) Continuation of application No. 14/176,706, filed on Feb. 10, 2014, now Pat. No. 9,202,031.

(51) Int. Cl.
*H04L 9/00*        (2006.01)
*H04L 29/06*       (2006.01)
(Continued)

(52) U.S. Cl.
CPC ............ *H04L 63/105* (2013.01); *G06F 21/31* (2013.01); *G06F 21/34* (2013.01); *G06F 21/40* (2013.01); *H04L 9/3228* (2013.01); *H04L 63/08* (2013.01); *H04L 63/083* (2013.01); *H04L 63/0838* (2013.01); *H04L 63/0853* (2013.01); *H04L 63/0892* (2013.01); *H04L 63/107* (2013.01); *H04L 2463/082* (2013.01)

(58) Field of Classification Search
CPC ..... H04L 63/105; H04L 63/107; H04L 63/08; H04L 63/0853; H04L 63/083; G06F 21/31; G06F 21/40; G06F 21/34
See application file for complete search history.

(56) References Cited

U.S. PATENT DOCUMENTS 7,171,460 B2   1/2007   Kalavade et al.
7,373,515 B2   5/2008   Owen et al.
(Continued)

OTHER PUBLICATIONS

International Search Report, dated May 14, 2015, Int'l Appl. No. PCT/US15/015176, Int'l Filing Date Feb. 10, 2015; 3 pgs.
(Continued)

*Primary Examiner* — Beemnet W Dada

(57) ABSTRACT

A system includes least one processor in communication with a memory storing instructions, the at least one processor to receive an authentication request comprising authentication information from a user requesting access to a computing device connected to a communications network, determine a type of authentication request sent by the user, transmit the authentication request to an appropriate authentication server responsive to the type of authentication request, receive an authentication response from the appropriate authentication server, determine a permission level for the user requesting access to the computing device and attach the permission level to the authentication response, and transmit the authentication response to the user requesting access to the computing device.

30 Claims, 6 Drawing Sheets

(51) Int. Cl.
*G06F 21/31* (2013.01)
*G06F 21/40* (2013.01)
*G06F 21/34* (2013.01)
*H04L 9/32* (2006.01)

(56) References Cited

U.S. PATENT DOCUMENTS

| | | | |
|---|---|---|---|
| 7,725,589 | B2 | 5/2010 | Nicodemus et al. |
| 8,627,410 | B2 | 1/2014 | Hughes et al. |
| 2002/0178354 | A1 | 11/2002 | Ogg et al. |
| 2003/0046589 | A1* | 3/2003 | Gregg ................ G06F 21/335 726/5 |
| 2006/0114897 | A1 | 6/2006 | Suri |
| 2007/0186106 | A1* | 8/2007 | Ting .................... H04L 63/104 713/168 |
| 2009/0165096 | A1 | 6/2009 | Hughes et al. |
| 2010/0050233 | A1 | 2/2010 | Ross |
| 2011/0055569 | A1 | 3/2011 | Zhang et al. |
| 2011/0271114 | A1 | 11/2011 | Baysinger |
| 2012/0167180 | A1* | 6/2012 | Lee ...................... G06F 21/31 726/4 |
| 2013/0031359 | A1 | 1/2013 | Laidlaw et al. |
| 2013/0139238 | A1 | 5/2013 | Ryan |
| 2013/0252583 | A1* | 9/2013 | Brown ................ H04W 12/06 455/411 |
| 2015/0227732 | A1 | 8/2015 | Doctor et al. |

OTHER PUBLICATIONS

Written Opinion of the International Searching Authority, dated May 14, 2015, Int'l Appl. No. PCT/US15/015176, Int'l Filing Date Feb. 10, 2015; 5 pgs.

White House, "National Strategy for the Physical Protection of Critical Infrastructures and Key Assets", Retrieved from https://www.dhs.gov/xlibrary/assets/Physical_Strategy.pdf, entire document Feb. 2003, 42 pgs.

International Preliminary Report on Patentability, dated Aug. 16, 2016, Int'l Appl. No. PCT/US15/015176, Int'l Filing Date Feb. 10, 2016; 7 pgs.

Extended European Search Report, dated Sep. 5, 2017, Application No. 15746319.1, filed Feb. 10, 2015; 5 pgs.

* cited by examiner

AUTHENTICATION SYSTEM AND METHOD

CROSS REFERENCE TO RELATED APPLICATIONS

This application is a continuation of, and claims the benefit of priority to, U.S. Non-Provisional application Ser. No. 14/176,706, titled "AUTHENTICATION SYSTEM AND METHOD," filed Feb. 10, 2014, which is hereby incorporated by reference herein.

TECHNICAL FIELD

The present systems and methods relate generally to a system and method for (Remote Authentication Dial-In User Service) "Radius" authentication, and more particularly to a system and method associated with role-based Radius authentication of a user using a security token, and a system and method associated with automatically converting a user from a first authentication type associated with a first security token to a second authentication type associated with a second security token.

BACKGROUND

Usernames and passwords are used to protect computer systems and can be used to authenticate a user. Use of a username and password to authenticate a user is a traditional single-factor security authentication mechanism. As an example, a user may want to view email that is stored on a server. The user sends a request to the server storing the email and the server storing the email responds by requesting a username and a password. If the user provides a valid username and password to the server, the server will provide the user access to the server and email. Single-factor authentication relies on diligence of a user to utilize a strong password and ensure that the password cannot be guessed or stolen. Unfortunately, passwords are easily compromised, and more complex authentication systems have been developed, such as multi-factor authentication.

Multi-factor authentication can be used in a variety of environments and in a variety of situations. As an example, a person attempting to withdraw funds from a bank account may have to provide two-factor authentication before making the withdrawal. The person may have to enter their personal identification number (PIN) associated with their ATM card as well as provide a one-time code that is sent to their mobile device via text message or email. This one-time code may only be valid for a certain time window, e.g. one hour.

Multi-authentication is a form of authentication requiring two or more authentication factors including knowledge factors, e.g., something that only the user knows, and possession factors, e.g., something only the user has. As an example, a knowledge factor can include a password or a PIN. A possession factor is similar to a key to a lock and can be a secret number. The secret number can be a one-time password, such a password that changes every sixty seconds and is generated using a random key, or a seed. The seed can be hard-coded into a security token, and is equivalent to a combination to a vault. The seed is different for each hardware security token and stored in a corresponding authentication server. An additional authentication factor can include an inherence factor, e.g., something only the user is. An inherence factor can include a fingerprint, a voiceprint, retinal scan, etc.

A security token, e.g., a hardware device or a software device, can be used in a two-factor authentication system as an electronic key to prove one's identity. A hardware security token can be a token with a display, such as a pocket-sized hardware token having a liquid crystal display (LCD) that displays a one-time password. The authentication server will know what number a particular hardware token should be showing, and uses this number to prove that a user is in possession of their token. The pocket-sized authentication token can be carried on a lanyard or attached to a key ring and carried in a pocket or a purse. The hardware security token also can be embedded in a cellular telephone, a smartcard that is inserted into a computer or detected via a proximity detector, or a universal serial bus (USB) token that is inserted into a computer. A software device can use a mobile device application to generate a one-time password.

Unfortunately, two-factor authentication methods also are not completely secure and have been compromised. In a well-documented event in 2011, hackers were able to reduce the effectiveness of a widely used proprietary two-factor authentication approach that uses a hardware security token. The hardware security token vendor was forced to replace forty million hardware tokens. Attackers had obtained seeds which were used by the hardware security tokens to generate one-time codes and used the seeds to exploit a defense contractor's virtual private network (VPN) access system. Because this authentication approach was so widely used and engrained in network hardware and software, it has been difficult to transition to using other authentication approaches. From a security perspective, it is important to transition away from authentication methods that have been compromised. This transition has proven expensive and presents companies and organizations with a difficult operational and logistical challenge.

Furthermore, many forms of authentication are inflexible, particularly with respect to network elements connected to a communications network. For instance, a Terminal Access Controller Access-Control System (TACACS) authentication server either accepts or denies an authentication request and either allows or denies access. Typically, a user sending a request to a TACACS server is granted full access to a network element connected to a communications network or granted no access to a network element connected to a communications network. This form of all or nothing access control is not appropriate for certain situations.

It is with these issues in mind, among others, that various aspects of the disclosure were conceived.

SUMMARY

Briefly described, and according to one embodiment, aspects of the present disclosure generally relate to a system and method for authentication, and more particularly to a system and method associated with role-based authentication of a user in possession of a security token. The system authenticates the user in possession of the security token and delegates an appropriate permission level for a computing device in realtime based on a location of the computing device and a region of a user. The system also automatically converts a user associated with a first authentication type associated with a first security token to a second authentication type associated with a second security token.

According to one embodiment, a system includes at least one processor in communication with a memory storing instructions, the at least one processor to receive an authentication request comprising authentication information from a user requesting access to a computing device connected to a communications network, determine a type of authentication request sent by the user, transmit the authentication request to an appropriate authentication server responsive to the type of authentication request, receive an authentication response from the appropriate authentication server, determine a permission level for the user requesting access to the computing device and attach the permission level to the authentication response, and transmit the authentication response to the user requesting access to the computing device.

According to a further embodiment, a method includes receiving, by at least one processor, an authentication request comprising authentication information from a user requesting access to a computing device connected to a communications network, determining, by the at least one processor, a type of authentication request sent by the user, transmitting, by the at least one processor, the authentication request to an appropriate authentication server responsive to the type of authentication request, receiving, by the at least one processor, an authentication response from the appropriate authentication server, determining, by the at least one processor, a permission level for the user requesting access to the computing device and attaching the permission level to the authentication response, and transmitting, by the at least one processor, the authentication response to the user requesting access to the computing device.

According to another embodiment, a non-transitory computer-readable medium includes instructions stored thereon that, when executed by at least one processor, cause the at least one processor to perform operations including receiving an authentication request comprising authentication information from a user requesting access to a computing device connected to a communications network, determining a type of authentication request sent by the user, transmitting the authentication request to an appropriate authentication server responsive to the type of authentication request, receiving an authentication response from the appropriate authentication server, determining a permission level for the user requesting access to the computing device and attaching the permission level to the authentication response, and transmitting the authentication response to the user requesting access to the computing device.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

Figure 1:
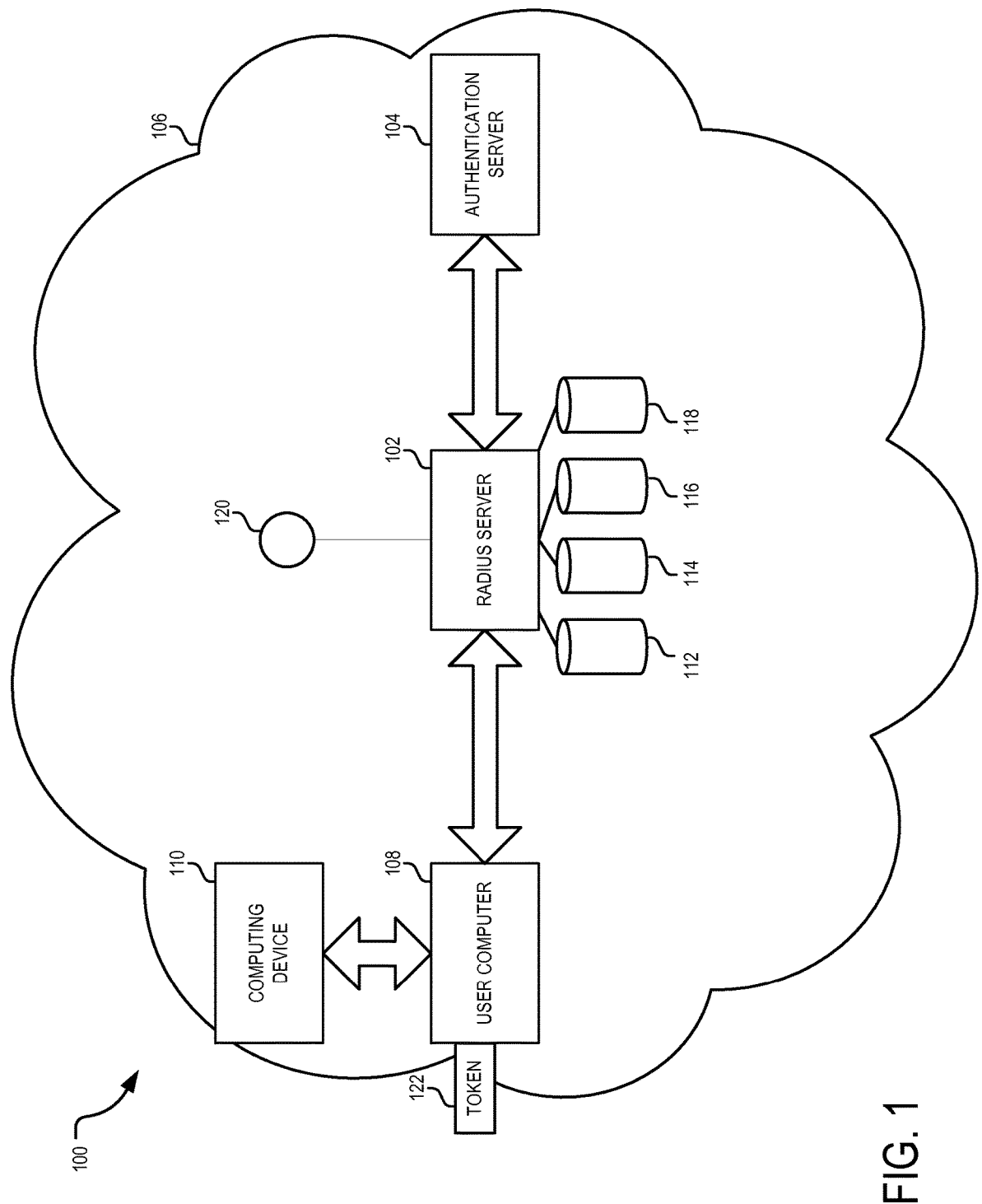
FIG. 1 illustrates a block diagram of an authentication system, according to an example embodiment.

For the purpose of promoting an understanding of the principles of the present disclosure, reference will now be made to the embodiments illustrated in the drawings, and specific language will be used to describe the same.

DETAILED DESCRIPTION

The embodiments disclosed herein provide a system and method for authenticating users. More particularly, the system and method uses multi-factor authentication and attaches a permission level to an authentication to provide a user with role-based access to a computing device such as a network element. According to an example embodiment, the system determines a type of security token used by a user, authenticates the user and attaches an appropriate permission level to an authentication response. According to a further example embodiment, the system automatically converts the user from a first authentication type associated with a first security token to a second authentication type associated with a second security token.

According to an example embodiment, a user in possession of a security token authenticates with a Radius server and obtains a permission level for a computing device. As an example, the security token can be used for multi-factor authentication. Using a secret key, e.g., a seed record stored in the token, the token generates a one-time use password. The user sends authentication information including access credentials to gain access to a computing device such as a network resource using the one-time use password and a PIN. The user then may request authentication to a network element and the request for authentication is routed to a Radius server. The Radius server provides authentication, authorization, and accounting services for users connecting to computing devices connected to a communications network.

First, the Radius server identifies the type of security token being used. Based on the type of token, the Radius server will execute a particular JavaScript to authenticate the user. More specifically, the Radius server determines whether the user requesting authentication has a known username by using the particular JavaScript to query an alias database. If the username is found in the alias database, then an Internet Protocol (IP) address of the computing device, an IP address of the computer from which the request was submitted, and the username are stored as a request in a temporary database that stores all authentication requests. After storing the request in the temporary database, the Radius server routes authentication information to an authentication server for authentication.

The authentication server determines the validity of authentication information and provides an authentication response to the Radius server. If the user is authenticated by the authentication server, the Radius server determines a permission level, attaches the permission level to the authentication response, and forwards the authentication response with the attached permission level to the user.

In order to determine the permission level, the Radius server performs a database query to determine a geographic region where the user is located and a location of the computing device. The permission level may be based on the region of the user and the location of the computing device, among other things. After forwarding the authentication response with the attached permission level to the user, the request will be deleted from the temporary requests database in the Radius server. As a result, the user can be authenticated using a variety of different security tokens and is provided an appropriate level of access to the computing device based on the permission level.

FIG. 1 illustrates a block diagram of an authentication system 100 according to an example embodiment. The system includes at least one Radius server 102 and at least one authentication server 104 communicating over a communications network 106 which may be a packet based wireline and/or wireless network. According to exemplary embodiments, the system 100 can be used to authenticate users using a variety of different security tokens and provide users an appropriate level of access to computing devices attached to the communications network 106.

As shown in FIG. 1, a user requests access using a user computer 108 attached to the communications network 106 and located in a first location to a computing device 110 attached to the communications network 106 and located in a second location. According to an example embodiment, the first location and the second location can be the same or different. For example, the computing device 110 may be a variety of computing devices handling data packets including a user workstation, e.g., a personal computer, a mobile device, and a network element that handles data packets including a router, a server, etc. As a first example, the user computer 108 can send the request from a first computer located in the first location and the computing device 110 can be a second computer located in the second location. As another example, the user computer 108 and the computing device 110 can be the same computing device.

The user computer 108 sends an authentication request to the at least one Radius server 102. The Radius server 102 may be running a Radius daemon 120 to receive authentication requests using the Radius protocol. Thus, communication between the user computer 108 and the at least one Radius server 102 is achieved via the Radius protocol and the user computer 108 sends a Radius message to the at least one Radius server 102. The Radius daemon 120 runs on the at least one Radius server 102 as a background process to serve received authentication requests. The at least one Radius server 102 can have multiple assigned IP addresses and utilize anycast, a network protocol that routes an authentication request from the user computer 108 in the first location to the at least one Radius server 102 that is closest to the user computer 108.

The authentication request sent from the user computer 108 includes authentication information. As an example, the authentication information sent from the user computer 108 to the at least one Radius server 102 includes at least one of an authoritative username, a password or PIN, a one-time password generated by a security token 122, and an IP address of the user computer 108. Based on the authoritative username in the authentication information, the at least one Radius server 102 determines a type of authentication request.

The security token 122 may be a hardware token and/or a software token such as an application executed by the user computer 108. According to an example embodiment, the security token 122 displays a one-time use password within the application on a display of the user computer 108 or on an LCD screen of a hardware token. The security token 122 may generate one-time passwords that change at fixed intervals (e.g., every sixty seconds) or based on an event such as a button press. As an example, a hardware token generates a new one-time password using a processor within the hardware token and a random key (e.g., a seed) hard-coded into the security token. A hardware token can be an RSA SecurID hardware token, a Cryptocard hardware token, a VeriSign hardware token, a Yubico hardware token, etc. Depending upon the authoritative username within the authentication request that is associated with a specific type of security token, the server 102 will execute appropriate JavaScript source code to determine whether the user should be granted access to the computing device 110. If the user is granted access to the computing device, the at least one Radius server 102 will determine an appropriate level of access for the user. The source code is not limited to JavaScript and can be any other appropriate source code that can be executed by the at least one Radius server 102.

The at least one Radius server 102 executes the source code and receives the authentication request from the user. After receiving the authentication information from the user, the at least one Radius server 102 queries an alias database 112 for the authoritative username in the authentication information. The alias database 112 is stored in transitory and/or non-transitory memory in the at least one Radius server 102 or stored in transitory and/or non-transitory memory that is connected to the at least one Radius server 102. The alias database 112 is a relational database that includes a collection of all authoritative usernames that are allowed to access computing devices that are connected to the communications network 106. As an example, an authoritative username Router.AdminUS is allowed to access and control any of the transport routers connected to the communications network 106 and located in the United States. A user is not limited to a single authoritative username and a user may have a plurality of valid authoritative usernames. As an example, authoritative usernames stored in the alias database 112 associated with the user may include First.Last, F.Last, F.L, 1234, and the like. Each of the at least one Radius server 102 synchronizes the alias database 112 at a regular interval, e.g., every five minutes, with a master copy of the alias database 112 from a master server (not shown). The master server may include at least one server computer with at least one processor and memory that stores information regarding all network devices connected to the communications network 106.

Each authoritative username stored in the alias database 112 has an optional boolean value that denotes whether the authoritative username is an active authoritative username. As an example, there are certain situations when an administrator of the at least one Radius server 102 may elect to make all authoritative usernames associated with a user or one authoritative username associated with a user inactive. As an example, an employee using the user computer 108 may be placed on temporary leave, and the administrator of the Radius server 102 can change the boolean value and make an authoritative username associated with the employee inactive. If the Radius server 102 queries the alias database 112 and finds the authoritative username associated with the authentication request, then the Radius server 102 ensures that the authoritative username is an active authoritative username.

Each authoritative username stored in the alias database 112 also has an optional value that denotes whether the authoritative username is associated with a user that has been screened. According to an example embodiment, users may be required to submit to a background check. If a user passes the background check, then the user will be screened. However, if the user does not pass the background check, then the user will not be screened. The screened value is not limited to being related with a background check, and can be used for other appropriate reasons, such as whether the user has signed a confidentiality agreement or whether the user has signed a non-disclosure agreement. The screened value also can be used to indicate a level of authority or access for computing devices connected to the communications network 106. As an example, the screened value can indicate that a user 108 is allowed a high level of access, a medium level of access, or a minimum level of access.

Each authoritative username stored in the alias database 112 also has a security token value that denotes an authentication type based on a type of security token that the authoritative username is associated with. The security token value is based on a last type of security token used to authenticate the user and can default to a first security token. As an example, a first username can be associated with a first authentication type and a first type of security token and a second username can be associated with a second authentication type and a second type of security token.

If the authoritative username is found in the alias database 112, and the authoritative username is an active authoritative username, then the at least one Radius server 102 will store authentication request information including the authoritative username, information associated with the computing device 110 including an IP address of the computing device 110, and an IP address of the user computer 108 as an authentication request in a temporary requests database 114. The temporary requests database 114 is stored in transitory and/or non-transitory memory in the at least one Radius server 102 or stored in transitory and/or non-transitory memory that is connected to the at least one Radius server 102. The temporary requests database 114 may be a table within the alias database 112 or a distinct database. The temporary requests database 114 is a relational database that includes a collection of all active authentication requests that are currently being processed by the at least one Radius server 102. As an example, the at least one Radius server 102 can be currently processing 2,000 authentication requests and authentication request information for each of the 2,000 authentication requests is stored in the temporary requests database 114.

Once the authentication request information is stored in the temporary requests database 114, the at least one Radius server 102 will determine whether the user of the user computer 108 needs a permission level for the computing device 110, e.g., whether the user of the user computer 108 needs to view or modify data stored in volatile and/or non-volatile memory associated with the computing device 110. As an example, the user of the user computer 108 may be requesting virtual private network (VPN) access to the computing device 110. As another example, the user of the user computer 108 may be a superuser that is granted full access to all computing devices connected to the communications network 106 and not need to authenticate using two-factor authentication. The superuser only needs to send a username and a password to the Radius server 102. In that case, the at least one Radius server 102 determines that the user of the user computer 108 is a superuser and does not route the authentication request to an authentication server 104. If the user of the user computer 108 does not need permission to view or modify data associated with the computing device 110, then the authoritative username is stored in a network access server (NAS).

If the user of the user computer 108 is not a superuser and authenticating using the security token 122, the at least one Radius server 102 determines a type of security token being used to authenticate. The at least one Radius server 102 determines a type of security token associated with a user using the authoritative username sent to the Radius server 102 by the user computer 108.

According to an exemplary embodiment, an administrator of the at least one Radius server 102 desires to allow users to authenticate using more than one security token, e.g., a first security token and/or a second security token. For instance, a user can be authenticated and provided a level of access to a computing device 110 via two-factor authentication using either a first hardware token, e.g., SecurID, or a second hardware token, e.g., a Cryptocard.

Administrative policies associated with the communications network 106 could require that all users associated with the communications network 106 transition from using a first security token provided by a first commercial supplier to a second security token provided by a second commercial supplier by a particular date. After the transition occurs, the user will no longer be able to use the first security token to authenticate and will only be able to use the second security token to authenticate. Thus, when the first security token is used to authenticate after the transition, the authentication attempt will fail, e.g., the authentication server 104 will reject the authoritative username. Upon failure, the Radius server 102 will attempt to authenticate using the second security token.

When a user attempts to authenticate using the second security token for a first time, the at least one Radius server 102 will recognize that this a first time that the user is using the new security token and insert the authoritative username into a temporary name conversion table in the alias database 112. This temporary name conversion table is for all authoritative usernames to be transitioned to a new security token and is checked regularly by the at least one Radius server 102, e.g., every minute. The Radius server 102 will automatically convert or modify the security token value for authoritative usernames that are in the temporary name conversion table from the first authentication type to the second authentication type for all authoritative usernames associated with the user in the alias database 112. After this conversion, the user will no longer be able to authenticate using the first security token. The user can return the first security token to a supervisor and the supervisor can request reimbursement from a commercial supplier of the first security token. As an example, a transition from a first security token to a second security token may be required if the first security token and/or any associated cryptographic algorithms become compromised or are believed to have become compromised.

After determining a type of security token and determining an appropriate authentication server associated with the security token 122, the at least one Radius server 102 forwards the authentication information in the authentication request to the authentication server 104. As an example, the at least one Radius server 102 can send at least one of the authoritative username, a password, a one-time use password, biometric information, and other authentication factors to the authentication server 104.

According to an example embodiment, the authentication server 104 includes at least one of a SecurID authentication server, a Cryptocard Blackshield authentication server, etc. Each of the authentication factors sent to the authentication server 104 must be validated to authenticate the user. The authentication server 104 will return an authentication response of Yes or No to the at least one Radius server 102. If the user is authenticated by the authentication server 104, the authentication server 104 returns an authentication response of "Yes" to the at least one Radius server 102. If the user is not authenticated by the authentication server 104, e.g., one of the authentication factors was invalid, the authentication server returns an authentication response of "No" to the at least one Radius server 102.

If the authentication server 104 authenticates the user of the user computer 108, then the at least one Radius server 102 attaches a permission level to the authentication response sent in a Radius message based on a number of factors including the screened value, a location of the user computer 108 and a location of the computing device 110. The at least one Radius server 102 performs additional database queries to determine where the user computer 108 is located and where the computing device 110 is located.

To determine the permission level, the at least one Radius server 102 will perform a database query in a subnets database 116. The subnets database 116 may include an IP address field, a fully qualified domain name (FQDN) field, a location field, and a type field. The subnets database 116 also may include a domestic critical infrastructure (DCI) field. The computing device 110 may be deemed to be DCI because the computing device 110 carries United States government communications that cannot leave the continent and/or cannot be viewed by a non-United States citizen.

The subnets database 116 is stored in transitory and/or non-transitory memory in the at least one Radius server 102 or stored in transitory and/or non-transitory memory that is connected to the at least one Radius server 102. The subnets database 116 may be a table within the alias database 112 or a distinct database. The subnets database 116 is a relational database that includes a collection of all subnets in the communications network 106 and a location associated with each subnet. Each subnet also can be used to denote a type of computing device 110 and indicate whether the computing device 110 is a DCI device. As an example, a first subnet can be associated with Colorado, United States and denote a transport router. A second subnet can be associated with Georgia, United States and denote a transport router. A third subnet can be associated with Virginia, United States and denote a core IP element. A fourth subnet can be associated with London, England and denote a switch. The at least one Radius server 102 uses the IP address of the computing device 110 stored in the temporary requests database 114 and derives a location of the computing device 110 using the subnets database 116.

The data that is stored in the subnets database 116 may be manually imported and/or automatically imported and updated at a regular interval such as every hour. At a regular interval, e.g., every hour, updated subnets data stored in a CSV file is copied to the master server. The master server compares the updated CSV file with a currently active version of the CSV file and determines any differences between the updated CSV file and the currently active CSV file. Any new entries are processed by the master server. If the master server finds a new entry in the updated CSV file, the master server will determine the new name, location, and device type, and insert the new entry into a copy of the subnets database 116 in the master server. If the master server determines that an entry should be deleted, then the master server deletes the entry to be deleted from the copy of the subnets database 116 in the master server.

If the subnets database 116 is a table within the alias database 112, then the updated subnets database 116 is copied to each of the at least one Radius server 102 when the alias database 112 is synchronized at a regular interval. If the subnets database 116 is distinct from the alias database 112, then each of the at least one Radius server 102 synchronizes the subnets database 116 at a regular interval, e.g., every hour, with the master server.

Next or concurrently with the query in the subnets database 116, the at least one Radius server 102 will perform a database query in a permissions database 118. The permissions database 118 may be a table within the alias database 112 or a distinct database. The permissions database 118 is stored in transitory and/or non-transitory memory in the at least one Radius server 102 or stored in transitory and/or non-transitory memory that is connected to the at least one Radius server 102. The permissions database 118 is a relational database that includes a collection of all geographical regions associated with the communications network 106 and a permission level for each user for each geographical region in the communications network. The permission level for each user for each geographical region is for a specific timeframe and can be modified by an administrator of the at least one Radius server 102. A permission level may be one of the following: No permissions, Execute, Write, Write & Execute, Read, Read & Execute, Read & Execute, Read & Write, and Read, Write & Execute. As an example, a first user located in a region of "United States" has a permission level of "Read/Write." As another example, a second user located in a region of "Europe" has a permission level of "Read Only." The at least one Radius server 102 uses the IP address of the user computer 108 stored in the temporary requests database 114 to determine a geographical region that the user is located in and derives a permission level for the user based on the data stored in the permissions database 118.

The at least one Radius server 102 uses the subnets database 116, the permissions database 118 and/or the screened value of the user to determine a permission level for the user. Use of the subnets database 116 and the permissions database 118 allows the Radius server 102 to enforce permission policies based on any particular criteria. As an example, the Radius server 102 may enforce permission policies related to computing devices that are deemed to be DCI.

In other words, a particular computing device 110 such as a transport router located in Virginia is not allowed to route certain United States government communications to a non-United States citizen. A citizen of the United Kingdom located in London, England and requesting access to a DCI transport router may only be granted Read Only access. However, if a United States citizen were located within the United States, then the at least one Radius server 102 would assign Read/Write access to the user for the DCI transport router located in Virginia. In addition, a United States citizen temporarily located in London, England requesting access to the DCI transport router can be granted Read/Write access.

The permission level applied to the user of the user computer 108 in realtime allows the at least one Radius server 102 to dynamically apply an appropriate permission level. At a first time, the user may be using a computer located in Colorado. At the first time, the user is allowed Read/Write access of a computing device 110 deemed to be DCI. At a second time, the user may be traveling and using another computer located in London, England. At this second time, at most, the user will be allowed Read Only access of a computing device deemed to be DCI. The at least one Radius server 102 is able to dynamically apply an appropriate permission level based on a current location of the user computer 108 at a specific time.

As another example, if the subnet of the computing device 110 indicates that the computing device 110 is in Europe, the Middle East and Africa (EMEA) and the user is allowed Read/Write permissions in the EMEA region, then the user of the user computer 108 will be assigned Read/Write permissions. If the subnet of the computing device 110 indicates that the computing device 110 is EMEA and the user is allowed Read Only permissions in the EMEA region, then the user of the user computer 108 will be assigned Read Only permissions.

As a further example, if the subnet of the computing device 110 indicates that the computing device 110 is in the US and the user is allowed Read/Write permissions in the US, then the user of the user computer 108 will be assigned Read/Write permissions. If the subnet of the computing device 110 indicates that the computing device is in the US and the user is allowed Read Only permissions in the US, then the user of the user computer 108 will be assigned Read Only permissions to the computing device 110.

In certain circumstances, the user of the user computer 108 may be denied all access to the computing device 110 and not receive Read/Write or Read Only permissions. For instance, the user may have a screened value that indicates that the user has not passed a background check. The at least one Radius server 102 will query the alias database 112 and determine that the user is not screened. As another example, certain computing devices attached to the communications network 106 may only be managed by superusers and all other users are denied access to these computing devices. The at least one Radius server 102 will automatically deny access to such a computing device to any user that is not a superuser.

Using the determined location of the user computer 108 and location of the computing device 110, the permission level is attached to the attributes portion of the Radius message by the at least one Radius server 102. Example code for attaching a permission level is provided below. When this code is compiled into computer executable instructions and is executed by processor 124, appropriate permissions will be set based on the specific type of computing device 110.

```
// "Name of Device", "Permissions Setting as Defined by Device"
// Read Write:
    ("Alcatel-Acce-Priv-F-R1", "ffffffff");
    ("Alcatel-Acce-Priv-F-R2", "ffffffff");
    ("Alcatel-Acce-Priv-F-W1", "ffffffff");
    ("Alcatel-Acce-Priv-F-W2", "ffffffff");
    ("Alcatel-Asa-Access", "all");
    ("BATM-privilege-group", "0");
    ("Callback-Id", "superuser");
    ("Cisco-AVPAIR", "shell:priv-lvl=15");
    ("Foundry-Command-String", "*");
    ("Foundry-Privilege-Level", "15");
    ("Foundry-INM-Privilege", "15");
    ("Timetra-Access", "3");
    ("Timetra-Default-Action", "1");
    ("Timetra-Profile", "administrative");
    ("Service-Type", "6");
// Read Only:
    ("Alcatel-Acce-Priv-F-R1", "ffffffff");
    ("Alcatel-Acce-Priv-F-R2", "ffffffff");
    ("Alcatel-Acce-Priv-F-W1", "00000000");
    ("Alcatel-Acce-Priv-F-W2", "00000000");
    ("Alcatel-Asa-Access", "all");
    ("Foundry-Privilege-Level", "5");
    ("Juniper-Allow-Commands", "show");
```

```
-continued ("Juniper-Deny-Commands",
        "(configure)|(edit)|(start shell)|(restart)");
    ("Timetra-Access", "2");
    ("Timetra-Default-Action", "0");
    ("Timetra-Profile", "default");
    ("Timetra-Action", "1");
    ("Timetra-Restrict-To-Home", "1");
    ("Cisco-AVPAIR", "shell:priv-lvl=1");
// No Access
    ("Juniper-Deny-Commands", "$");
// All other devices will fail if no attributes are passed back.
```

Once the permission level is determined and attached to the authentication response, the at least one Radius server 102 transmits the Radius message with the authentication response with the attached permission level to the user computer 108. The user of the user computer 108 is granted an appropriate level of access to the computing device 110 based on the authentication response and permission level. Once the appropriate level of access to the computing device 110 is granted to the user of the user computer 108, the authentication request stored in the temporary requests database 114 is deleted by the at least one Radius server 102.

According to an example embodiment, the at least one Radius server 102 may be at least one Steel-Belted Radius (SBR) Server, e.g., a Steel-Belted Radius Server Global Enterprise Edition, provided by Juniper Networks. An SBR server can be used to determine what users can connect to computing devices attached to the communications network 106, when users can connect to computing devices attached to the communications network 106, and how long users can be provided access to computing devices attached to the communications network 106. However, the at least one Radius server 102 is not limited to an SBR server and may be at least one computer that may operate as a server providing authentication, authorization, and accounting (AAA) having the processor 124 and the memory 126. As an example, the server is not limited to the Radius protocol and may be a Diameter server using the Diameter protocol or another AAA server using another AAA protocol.

According to an example embodiment, the at least one Radius server 102 can include Windows®, Solaris, Linux (e.g., Red Hat), and any other suitable operating system. According to an example embodiment, the Radius daemon 120 can be FreeRADIUS, which is currently the most widely used Radius server worldwide. FreeRADIUS is a daemon for Unix and Unix-like operating systems that provides a RADIUS protocol server which can be used for authentication and accounting for various types of network access. The FreeRADIUS daemon differs from other radius servers for a number of reasons, including supporting proxying. Thus, the FreeRADIUS daemon allows the at least one Radius server 102 to send received authentication requests to a variety of different authentication servers.

Figure 2:
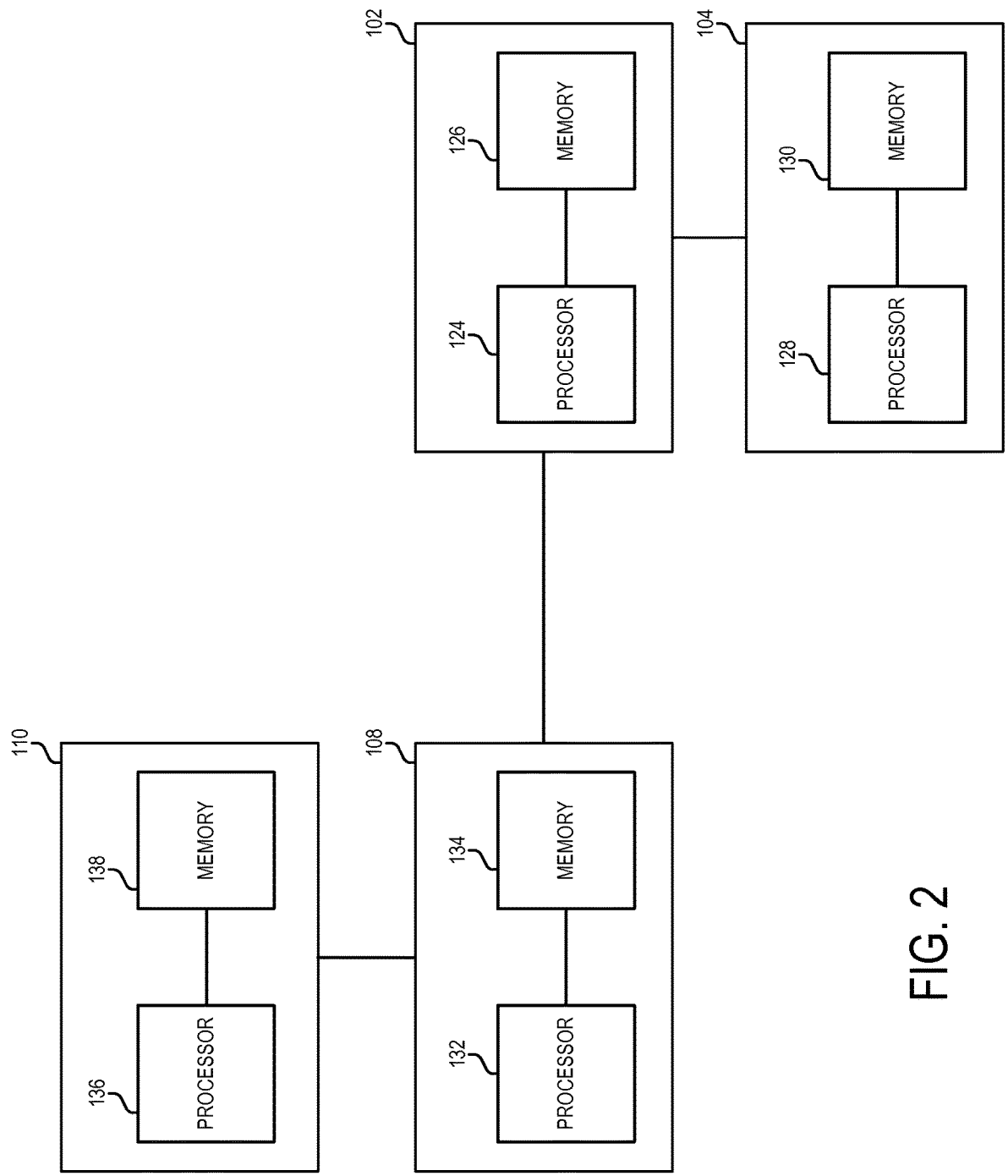
FIG. 2 illustrates an additional block diagram of an authentication system, according to an example embodiment.

Now referring to FIG. 2, the at least one Radius server 102 receives communications from a user of the user computer 108 over the communications network 106. The at least one Radius server 102 includes at least one processor 124 to process data and memory 126 to store data. The processor 124 processes communications, builds communications, retrieves data from its memory 126, and stores data to its memory 126. The memory 126 may include volatile and/or non-volatile memory, e.g., a computer-readable storage medium such as a cache, random access memory (RAM), read only memory (ROM), flash memory, or other memory to store data and/or computer-readable executable instructions such as FreeRADIUS. The memory 126 can be used to store the alias database 112, the temporary requests database 114, the subnets database 116, and the permissions database 118. In addition, the at least one Radius server 102 further includes at least one communications interface to transmit and receive communications, messages, and/or signals.

The at least one Radius server 102 is configured to communicate with the authentication server 104. The authentication server 104 includes at least one processor 128 to process data and memory 130 to store data. The processor 128 processes communications, builds communications, retrieves data from its memory 130, and stores data to its memory 130. The memory 130 may include volatile and/or non-volatile memory, e.g., a computer-readable storage medium such as a cache, random access memory (RAM), read only memory (ROM), flash memory, or other memory to store data and/or computer-readable executable instructions such as authentication server software. In addition, the authentication server 104 further includes at least one communications interface to transmit and receive communications, messages, and/or signals. According to an example embodiment, the authentication server 104 includes at least one of an RSA authentication server, a Cryptocard Blackshield server, and/or other commercially available authentication servers.

The user computer 108 is configured to communicate with the at least one Radius server 102 and the computing device 110. The user computer 108 (e.g., a user workstation, a mobile device, etc.) includes at least one processor 132 to process data and memory 134 to store data. The processor 132 processes communications, builds communications, retrieves data from its memory 134, and stores data to its memory 134. The memory 134 may include volatile and/or non-volatile memory, e.g., a computer-readable storage medium such as a cache, random access memory (RAM), read only memory (ROM), flash memory, or other memory to store data and/or computer-readable executable instructions. In addition, the user computer 108 further includes at least one communications interface to transmit and receive communications, messages, and/or signals.

The computing device 110 (e.g., a user workstation, a router, etc.) includes at least one processor 136 to process data and memory 138 to store data. The processor 136 processes communications, builds communications, retrieves data from its memory 138, and stores data to its memory 138. The memory 138 may include volatile and/or non-volatile memory, e.g., a computer-readable storage medium such as a cache, random access memory (RAM), read only memory (ROM), flash memory, or other memory to store data and/or computer-readable executable instructions. In addition, the computing device 110 further includes at least one communications interface to transmit and receive communications, messages, and/or signals.

Figure 3:
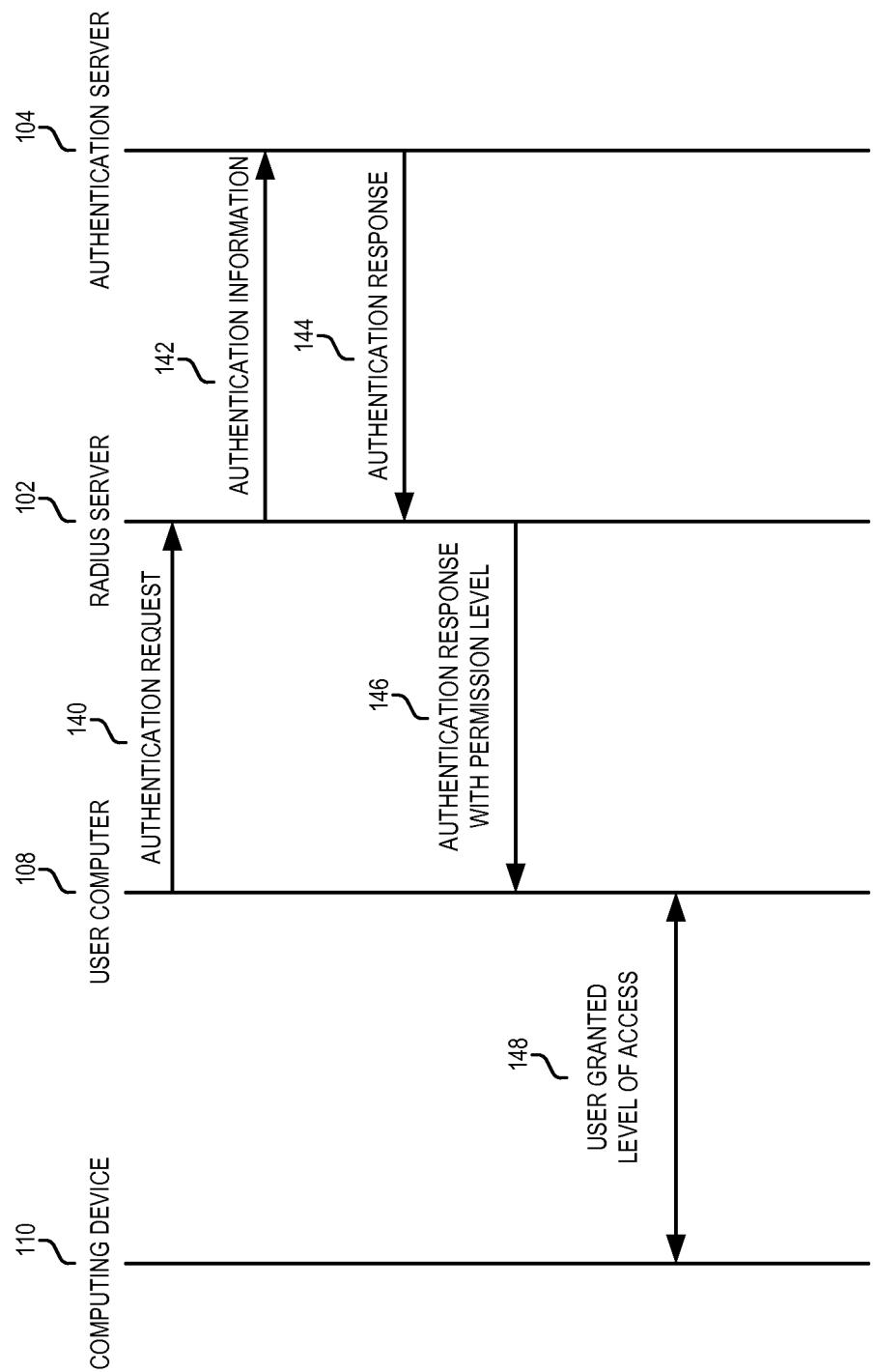
FIG. 3 illustrates a timeflow chart of an authentication system, according to an example embodiment.

FIG. 3 illustrates a timeflow chart of an authentication system 100 according to an example embodiment. As shown in FIG. 3, a user computer 108 located at a first location transmits an authentication request 140 with authentication information to the at least one Radius server 102. According to an example embodiment, the authentication information includes an authoritative username and multi-factor authentication information. As shown in FIG. 3, the user of the user computer 108 is requesting access to the computing device 110. After determining that the authoritative username of the user is in the alias database 112, the at least one Radius server 102 will store a request including the authoritative username, an IP address of the user computer 108, and an IP address of the computing device 110 in the requests temporary database 114.

Next, the at least one Radius server 102 will forward authentication information 142 to an appropriate authentication server 104 based on the authentication type value in the alias database 112. According to an example embodiment, the authentication information 142 may be multifactor authentication information and may include a PIN and a one-time use password. The authentication server 104 will attempt to validate the authentication information 142 and transmit an authentication response 144 back to the Radius server 104. The at least one Radius server 102 will receive the authentication response 144 and perform a database query in the subnets database 116 and perform a database query in the permissions database 118 to determine a permission level for the user of the user computer 108. The at least one Radius server 102 will attach the permission level for the user to the authentication response 144 and transmit the authentication response with a permission level 146 to the user computer 108. Depending upon the authentication response with a permission level 146, the user of the user computer 108 will be granted a level of access 148 to the computing device 110.

Figure 4:
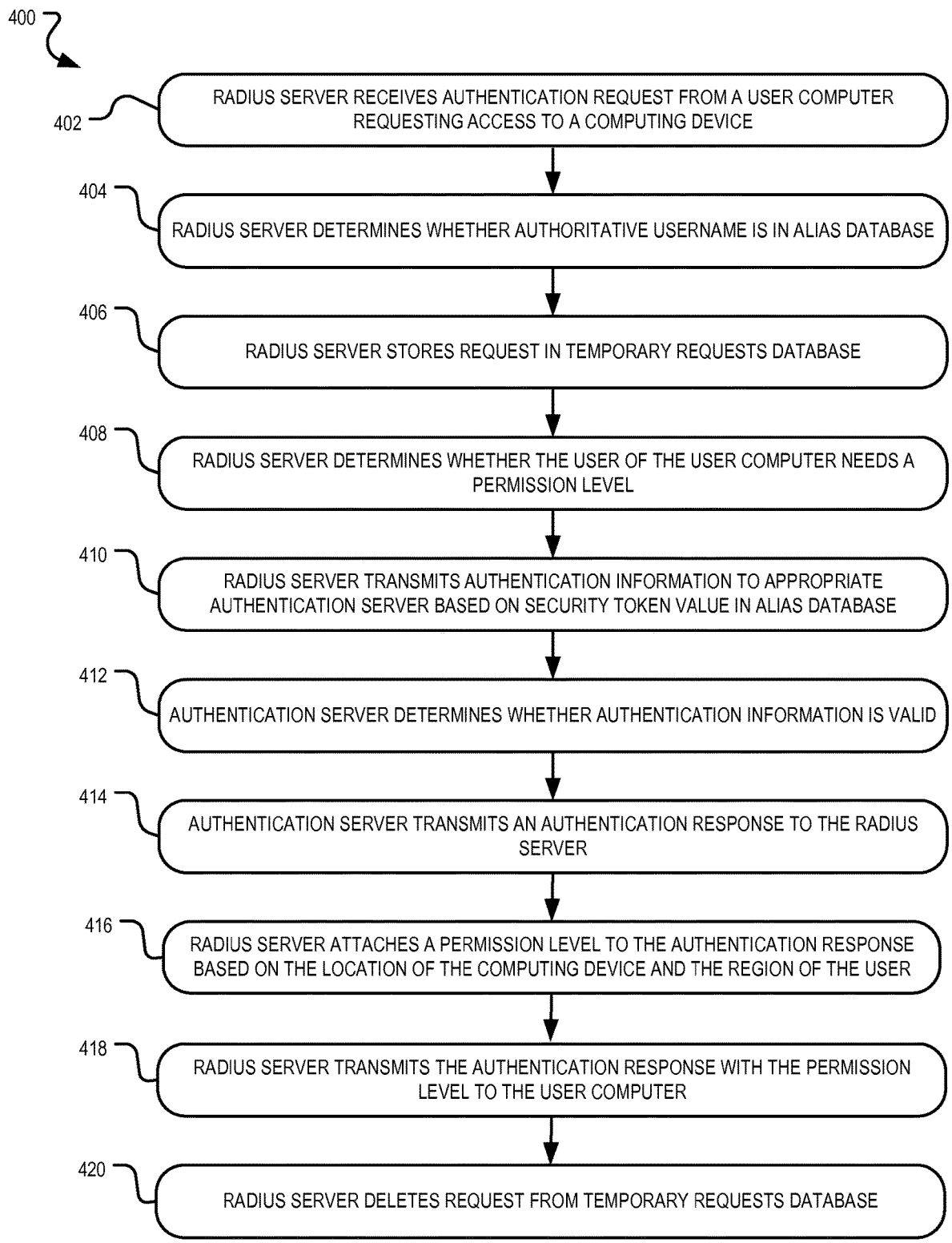
FIG. 4 illustrates a flowchart of a process for authentication using an authentication system, according to an example embodiment.

FIG. 4 illustrates a flowchart of a process 400 for authentication using an authentication system 100 according to an example embodiment. The process shown in FIG. 4 begins in step 402. In step 402, the at least one Radius server 102 receives an authentication request 140 from a user of the user computer 108 requesting access to a computing device 110. The authentication request 140 includes authentication information, e.g., an authoritative username, a PIN, and a one-time password. The one-time password is generated by a security token 122 that is in possession of the user, e.g., a hardware token including SecurID, Cryptocard, etc.

Next, in step 404, the at least one Radius server 102 determines whether the authoritative username of the user is found in the alias database 112. If the authoritative username is found in the alias database 112, in step 406, the authoritative username, IP address of the user computer 108, and IP address of the computing device 110 are stored as a request in the temporary requests database 114.

In step 408, the at least one Radius server 102 determines if the user of the user computer 108 needs to request a permission level. The user may be a superuser and not need to request a permission level or only require minimal access to the computing device 110, e.g., the user is a VPN user. If the user does not require a permission level for the computing device 110 (e.g., a VPN user), then the Radius server 102 stores the authoritative username in a network access server (NAS). If the user is a superuser, then the user may not need to authenticate with the authentication server 104, and the process 400 may end here.

Next, in step 410, the at least one Radius server 102 routes authentication information 142 from the authentication request 140 to an appropriate authentication server 104 depending upon the type of security token used. The type of security token is derived from the security token value in the alias database 112.

In step 412, the authentication server 104 determines whether authentication information 142 provided by the user is valid. In step 414, the authentication server 104 transmits an authentication response 144 of YES or NO back to the at least one Radius server 102.

In step 416, if the authentication response is YES, then the at least one Radius server 102 attaches a permission level to the authentication response 146. First, the at least one Radius server 102 obtains the IP address of the computing device 110 and the IP address of the user computer 108 from the temporary requests database 114. The at least one Radius server 102 determines a subnet of the computing device 110 based on the IP address of the computing device 110 using the subnets database 116. The at least one Radius server 102 also determines a permission level for the user in a geographical region associated with the IP address of the user computer 108 using the permissions database 118. The permission level may be based on whether the computing device 110 is deemed to be DCI.

As an example, if the computing device 110 is located outside of the United States and the user is allowed Read/Write permissions outside of the United States, the user of the user computer 108 is granted Read/Write permissions. If the computing device 110 is located outside of the United States and the user is allowed Read Only permissions outside of the United States, the user of the user computer 108 is granted Read Only permissions. If the computing device 110 is located inside of the United States and the user is allowed Read/Write permissions inside the United States, then the user of the user computer 108 is granted Read/Write permissions. If the computing device 110 is located inside the United States and the user is allowed Read Only permissions inside the United States, then the user of the user computer 108 is granted Read Only permissions. It is also possible that the user of the user computer 108 is granted a permission level with no access, or some other appropriate permission level.

In step 418, the at least one Radius server 102 sends the authentication response with the attached permission level 146 to the user of the user computer 108 as determined by the at least one Radius server 102. In step 420, the at least one Radius server 102 deletes the request from the temporary requests database 114.

Figure 5:
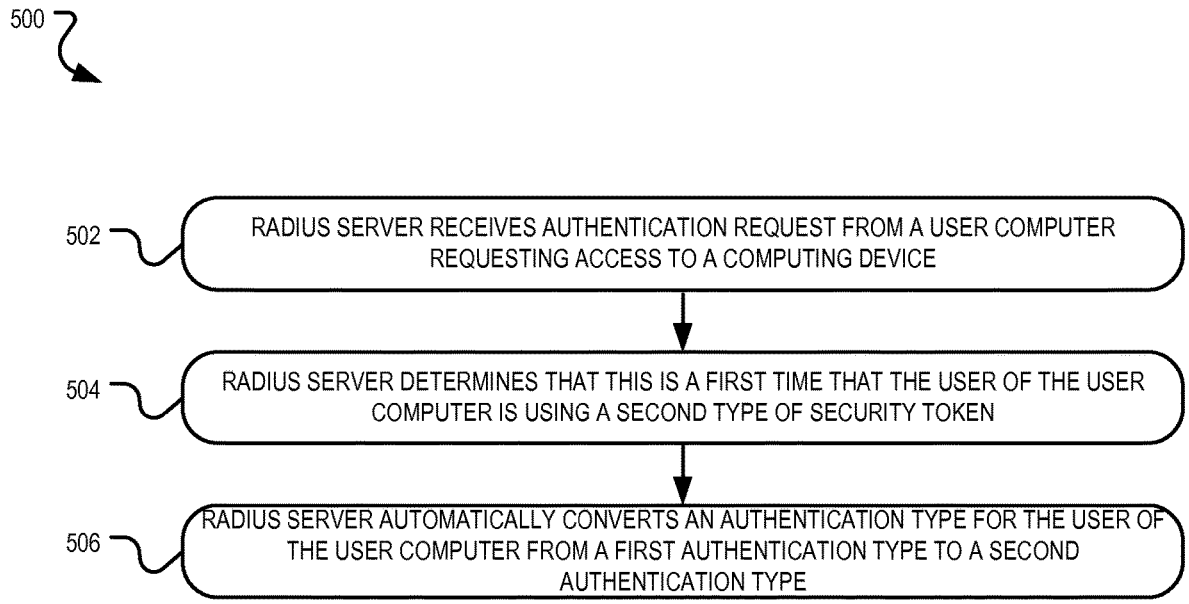
FIG. 5 illustrates a flowchart of a process for automatically converting a user from a first authentication type associated with a first security token to a second authentication type associated with a second security token using an authentication system, according to an example embodiment.

FIG. 5 illustrates a flowchart of a process 500 for automatically converting a user from a first authentication type associated with a first security token to a second authentication type associated with a second security token using an authentication system 100 according to an example embodiment. The process shown in FIG. 5 begins in step 502. In step 502, the at least one Radius server 102 receives an authentication request 140 from a user of a user computer 108 requesting access to a computing device 110. The authentication request 140 includes authentication information 142, e.g., an authoritative username, a PIN, and a one-time password. The one-time password is generated by a security token 122 that is in possession of the user, e.g., a hardware token including SecurID, Cryptocard, etc. According to an example embodiment, the security token 122 is a second type of security token, e.g., a Cryptocard.

In step 504, using the security token value in the alias database, the at least one Radius server 102 determines that this is a first time that the user is using the second type of security token rather than the first type of security token. The user had previously used the first type of security token, e.g., a SecurID, to authenticate and gain access to the computing device 110. However, the user is now attempting to authenticate and gain access to the computing device 110 using the second type of security token, e.g. a Cryptocard.

In step 506, the at least one Radius server 102 automatically converts an authentication type for the user from a first authentication type to a second authentication type. The at least one Radius server 102 changes the security token value in all database entries associated with the user of the user computer 108 in the alias database 112 from the first type of security token to the second type of security token. In other words, the at least one Radius server 102 associates all authoritative usernames associated with the user of the user computer 108 with the second type of security token and disassociates all authoritative usernames associated with the user of the user computer 108 with the first type of security token. After this conversion, the user is no longer able to use the second security token to authenticate.

Figure 6:
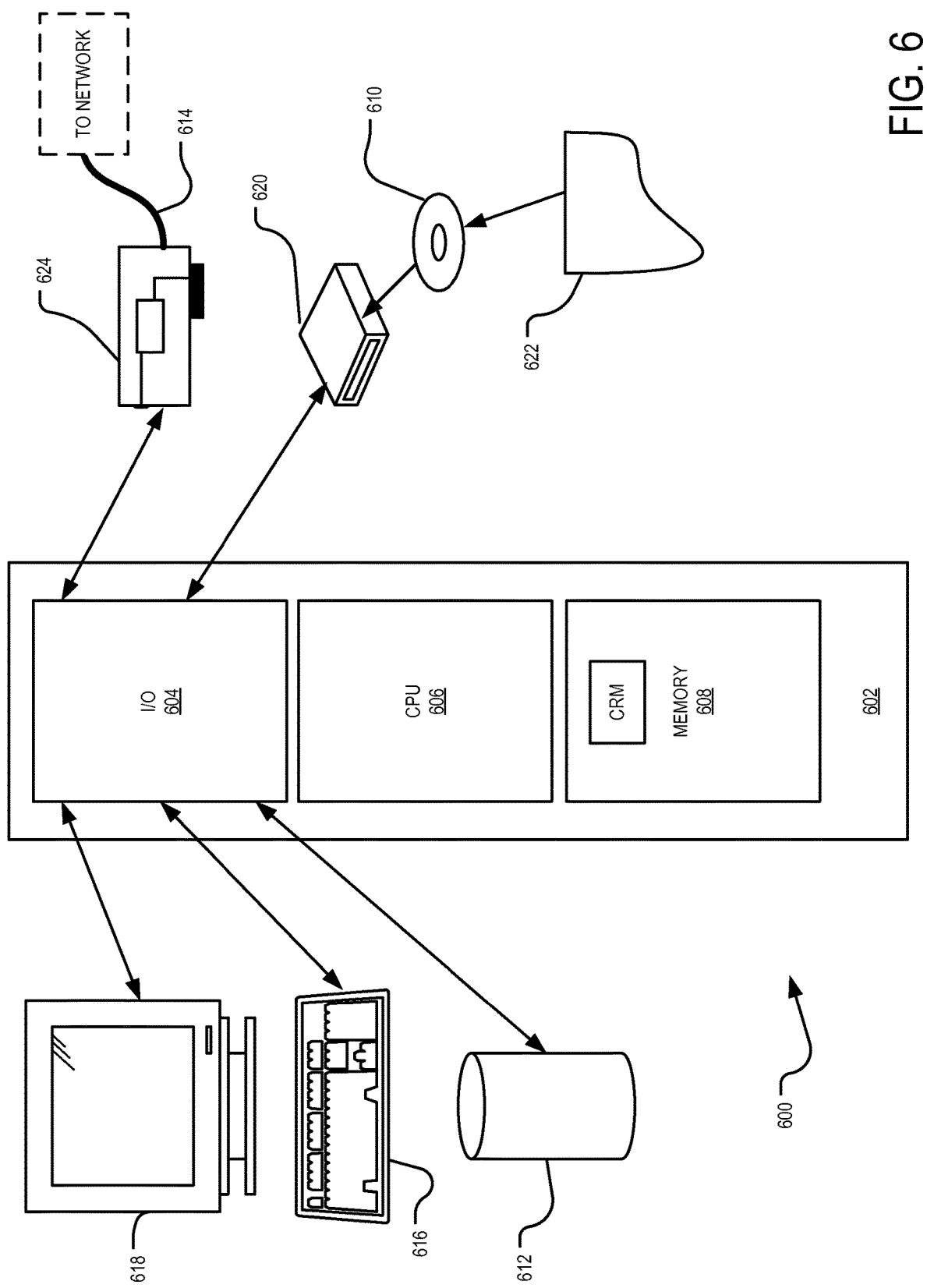
FIG. 6 illustrates a block diagram of an example computer device for use with the example embodiments.

FIG. 6 illustrates an example computing system 600 that may implement various systems, such as the at least one Radius server 102, the authentication server 104, the user computer 108, the computing device 110, and methods discussed herein, such as process 400 and process 500. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a central processing unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a server, a distributed computer, or any other type of computer, such as one or more external computers made available via a cloud computing architecture. The presently described technology is optionally implemented in software devices loaded in memory 608, stored on a configured DVD/CD-ROM 610 or storage unit 612, and/or communicated via a wired or wireless network link 614, thereby transforming the computer system 600 in FIG. 6 to a special purpose machine for implementing the described operations.

The memory section 608 may be volatile media, nonvolatile media, removable media, non-removable media, and/or other media or mediums that can be accessed by a general purpose or special purpose computing device. For example, the memory section 608 may include non-transitory computer storage media and communication media. Non-transitory computer storage media further may include nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data.

The I/O section 604 is connected to one or more user-interface devices (e.g., a keyboard 616 and a display unit 618), a disc storage unit 612, and a disc drive unit 620. Generally, the disc drive unit 620 is a DVD/CD-ROM drive unit capable of reading the DVD/CD-ROM medium 610, which typically contains programs and data 622. Computer program products containing mechanisms to effectuate the systems and methods in accordance with the presently described technology may reside in the memory section 604, on a disc storage unit 612, on the DVD/CD-ROM medium 610 of the computer system 600, or on external storage devices made available via a cloud computing architecture with such computer program products, including one or more database management products, web server products, application server products, and/or other additional software components. Alternatively, a disc drive unit 620 may be replaced or supplemented by a floppy drive unit, a tape drive unit, or other storage medium drive unit. The network adapter 624 is capable of connecting the computer system 600 to a network via the network link 614, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, source code executed by the at least one Radius server 102 and the authentication server 104, a plurality of internal and external databases, source databases, and/or cached data on servers such as alias database 112, temporary requests database 114, subnets database 116, and permissions database 118 are stored in memory of the at least one Radius server 102, including the memory 608 or other storage systems, such as the disk storage unit 612 or the DVD/CD-ROM medium 610, and/or other external storage devices made available and accessible via a network architecture. The source code executed by the at least one Radius server 102 and authentication server 104 may be embodied by instructions stored on such storage systems and executed by the processor 602.

Some or all of the operations described herein may be performed by the processor 602. Further, local computing systems, remote data sources and/or services, and other associated logic represent firmware, hardware, and/or software configured to control operations of the system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 602 and a user may interact with a Graphical User Interface (GUI) using one or more user-interface devices (e.g., the keyboard 616, the display unit 618, and the user devices 604) with some of the data in use directly coming from online sources and data stores. The system set forth in FIG. 6 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   at least one processor in communication with a memory storing instructions that, when executed by the at least one processor, cause the system to:
   receive an authentication request comprising authentication information from a user device requesting access for a user to a computing device connected to a communications network;
   transmit the authentication request to an appropriate authentication server responsive to a type of authentication request;
   receive an authentication response from the appropriate authentication server;
   identify a permission level for the user requesting access to the computing device, wherein identifying the permission level includes determining a location of the computing device and a location of the user device and determining the permission level based at least on the location of the computing device and the location of the user device;

attach the permission level to the authentication response; and transmit the authentication response, including the attached permission level, to the user device.

2. The system of claim 1, wherein the authentication information comprises multi-factor authentication information comprising at least an authoritative username, a personal identification number (PIN), and a one-time password.

3. The system of claim 2, the instructions causing the system further to:

determine that the authoritative username is present in an alias database; and store the authoritative username, an internet protocol (IP) address of the user device, and an IP address of the computing device as a request in a requests database.

4. The system of claim 2, the instructions causing the system further to:

determine the location of the computing device based on a location associated with the IP address of the computing device, the location of the computing device derived from a subnets database storing subnet information comprising a plurality of subnets in the communications network and a location associated with each subnet;

determine a region permission of the user based on determining a region associated with the IP address of the user device, the region permission of the user derived from a permissions database storing region permissions for the user for a plurality of regions associated with the communications network; and determine the permission level responsive to the location of the computing device and the region permission of the user.

5. The system of claim 4, wherein the permission level is one of Read/Write, Read Only, and None.

6. The system of claim 4, wherein the region is one of inside the United States and outside the United States.

7. The system of claim 4, the instructions causing the system further to:

delete the request from the requests database.

8. The system of claim 3, the instructions causing the system further to synchronize the alias database at a predetermined interval.

9. The system of claim 1, wherein the computing device is domestic critical infrastructure (DCI).

10. The system of claim 1, wherein the computing device transports communications that cannot be viewed by a non-United States citizen.

11. A method, comprising:

receiving, by at least one processor, an authentication request comprising authentication information from a user device requesting access for a user to a computing device connected to a communications network;

transmitting, by the at least one processor, the authentication request to an appropriate authentication server responsive to a type of authentication request;

receiving, by the at least one processor, an authentication response from the appropriate authentication server;

identifying, by the at least one processor, a permission level for the user requesting access to the computing device, wherein identifying the permission level includes determining a location of the computing device and determining the permission level based at least on the location of the computing device;

attaching the permission level to the authentication response; and transmitting, by the at least one processor, the authentication response, including the attached permission level, to the user device.

12. The method of claim 11, wherein the authentication information comprises multi-factor authentication information comprising at least an authoritative username, a personal identification number (PIN), and a one-time password.

13. The method of claim 12, further comprising:

determining that the authoritative username is present in an alias database; and storing the authoritative username, an internet protocol (IP) address of the user device, and an IP address of the computing device as a request in a requests database.

14. The method of claim 12, further comprising:

determining the location of the computing device based on a location associated with the IP address of the computing device, the location of the computing device derived from a subnets database storing subnet information comprising a plurality of subnets in the communications network and a location associated with each subnet;

determining a region permission of the user based on a region associated with the IP address of the user device, the region permission of the user derived from a permissions database storing region permissions for the user for a plurality of regions associated with the communications network; and determining the permission level responsive to the location of the computing device and the region permission of the user.

15. The method of claim 14, wherein the permission level is one of Read/Write, Read Only, and None.

16. The method of claim 14, wherein the region is one of inside the United States and outside the United States.

17. The method of claim 14, further comprising:

deleting the request from the requests database.

18. The method of claim 13, further comprising:

synchronizing the alias database at a predetermined interval.

19. The method of claim 11, wherein the computing device is domestic critical infrastructure (DCI).

20. The method of claim 11, wherein the computing device transports communications that cannot be viewed by a non-United States citizen.

21. A non-transitory computer-readable medium having instructions stored thereon that, when executed by at least one processor, cause the at least one processor to perform operations comprising:

receiving an authentication request comprising authentication information from a user device requesting access for a user to a computing device connected to a communications network;

transmitting the authentication request to an appropriate authentication server responsive to a type of authentication request;

receiving an authentication response from the appropriate authentication server;

identifying a permission level for the user requesting access to the computing device, wherein identifying the permission level includes determining a location of the computing device and a location of the user device and determining the permission level based at least on the location of the computing device and the location of the user device;

attaching the permission level to the authentication response; and transmitting the authentication response, including the attached permission level, to the user device.

22. The non-transitory computer-readable medium of claim 21, wherein the authentication information comprises multi-factor authentication information comprising at least an authoritative username, a personal identification number (PIN), and a one-time password.

23. The non-transitory computer-readable medium of claim 22, the operations further comprising:

determining that the authoritative username is present in an alias database; and storing the authoritative username, an internet protocol (IP) address of the user device, and an IP address of the computing device as a request in a requests database.

24. The non-transitory computer-readable medium of claim 22, the operations further comprising:

determining the location of the computing device based on a location associated with the IP address of the computing device, the location of the computing device derived from a subnets database storing subnet information comprising a plurality of subnets in the communications network and a location associated with each subnet;

determining a region permission of the user based on a region associated with the IP address of the user device, the region permission of the user derived from a permissions database storing region permissions for the user for a plurality of regions associated with the communications network; and determining the permission level responsive to the location of the computing device and the region permission of the user.

25. The non-transitory computer-readable medium of claim 24, wherein the permission level is one of Read/Write, Read Only, and None.

26. The non-transitory computer-readable medium of claim 24, wherein the region is one of inside the United States and outside the United States.

27. The non-transitory computer-readable medium of claim 24, the operations further comprising:

deleting the request from the requests database.

28. The non-transitory computer-readable medium of claim 23, the operations further comprising:

synchronizing the alias database at a predetermined interval.

29. The non-transitory computer-readable medium of claim 21, wherein the computing device is domestic critical infrastructure (DCI).

30. The non-transitory computer-readable medium of claim 21, wherein the computing device transports communications that cannot be viewed by a non-United States citizen.

* * * * *